(12) United States Patent
Kubsky et al.

(10) Patent No.: US 8,479,311 B2
(45) Date of Patent: Jul. 2, 2013

(54) DEVICE AND METHOD FOR AN ATOMIC FORCE MICROSCOPE FOR THE STUDY AND MODIFICATION OF SURFACE PROPERTIES

(75) Inventors: Stefan Kubsky, Les Ulis (FR); Deirdre Olynick, El Cerrito, CA (US); Peter Schuck, Richmond, CA (US); Jan Meijer, Bochum (DE); Ivo W. Rangelow, Baunatal (DE)

(73) Assignees: Technische Universitat Ilmenau (DE); Synchrotron Soleil (FR); The Regents of the University of California, Okland, CA (US)

( * ) Notice: Subject to any disclaimer, the term of this patent is extended or adjusted under 35 U.S.C. 154(b) by 253 days.

(21) Appl. No.: 12/747,617

(22) PCT Filed: Dec. 10, 2008

(86) PCT No.: PCT/EP2008/067253
§ 371 (c)(1),
(2), (4) Date: Oct. 22, 2010

(87) PCT Pub. No.: WO2009/074617
PCT Pub. Date: Jun. 18, 2009

(65) Prior Publication Data
US 2011/0055985 A1 Mar. 3, 2011

(30) Foreign Application Priority Data
Dec. 11, 2007 (DE) .................. 10 2007 060 460

(51) Int. Cl.
*G01Q 60/24* (2010.01)
(52) U.S. Cl.
CPC ..................... *G01Q 60/24* (2013.01)
USPC .......................................................... 850/33
(58) Field of Classification Search
USPC .......................................................... 850/33
See application file for complete search history.

(56) References Cited

U.S. PATENT DOCUMENTS
7,260,051 B1 * 8/2007 Rust et al. ................. 369/126

FOREIGN PATENT DOCUMENTS
DE 10307561 A1 9/2004
DE 102004031250 A1 1/2006

OTHER PUBLICATIONS
Farahani et al, "Single Quantum Dot Coupled to a Scanning Optical Antenna: A Tunable Superemitter", PRL 95, 017402 (2005).
Grabiec et al. "SNOM/AFM microprobe integrated with piezoresistive cantilever beam for multifunctional surface analysis", Microelectronic Engineering 61-62 (2002) pp. 981-986.

(Continued)

*Primary Examiner* — Kiet T Nguyen
(74) *Attorney, Agent, or Firm* — Mayer & Williams PC

(57) ABSTRACT

The invention relates to a device for an atomic force microscope (AFM) for the study and/or modification of surface properties. The device comprises a cantilever (flexible bar) having an integrated, piezoresistive sensor, an integrated bimorphic actuator, and a measuring tip. The measuring tip carries at least two metal electrodes, which can be activated via electrical terminals. The measuring tip and/or the cantilever have at least one nanoscopic hole through which synchrotron radiation or laser light is directed onto the material surface to be studied. Furthermore, the invention relates to a method for the study and modification of surface properties and surface-proximal properties, which can be executed using such a device. To this end, atomic force microscopy (AFM), surface enhanced Raman scattering (SERS), photo emission spectroscopy (XPS, XAS), and material modification by local exposure are executed in sequence or simultaneously using the same device.

18 Claims, 7 Drawing Sheets

OTHER PUBLICATIONS

Persaud et al., "Micromachined piezoresistive proximal probe with integrated bimorph actuator for aligned single ion implantation", J. Vac. Sci. Technol. B 24(6), Nov./Dec. 2006, pp. 3148-3151.

Rangelow, "Piezoresistive Scanning Proximity Probes for Nanoscience", Technisches Messen 72 (2005) 2, pp. 103-110.

* cited by examiner

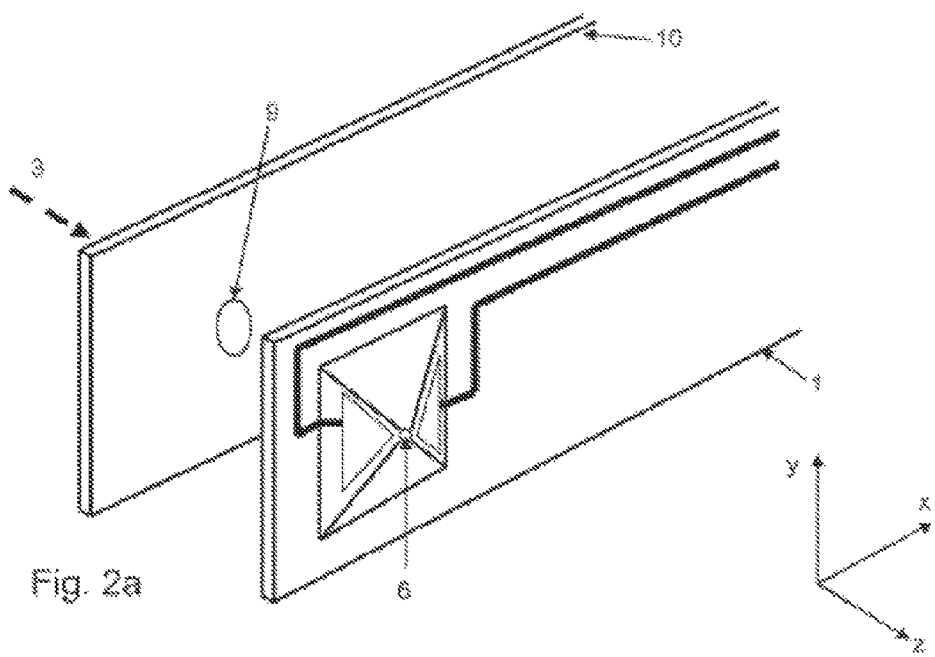
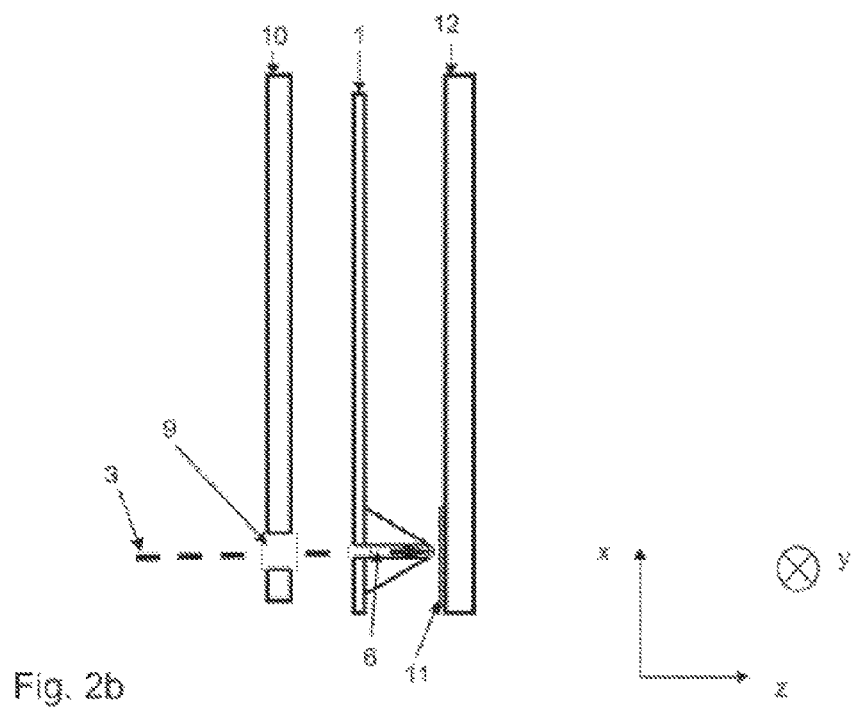

DEVICE AND METHOD FOR AN ATOMIC FORCE MICROSCOPE FOR THE STUDY AND MODIFICATION OF SURFACE PROPERTIES

BACKGROUND

The invention relates to a device and a method for the study and modification of the properties near surfaces and of surfaces of different types of materials. The device and method are utilized in the context of an atomic force microscope (AFM).

The AFM method is a commonly deployed method in industry and research to scan a surface with the aid of a very sharp measurement tip. The measurement tip is located at the unsupported end of a micromechanical cantilever and reacts to short-ranged (van der Waals) forces. The AFM method is frequently deployed in the areas of surface physics, molecular biology, pharmacology, the material sciences, and nano technology. Furthermore AFMs are utilized in industry on the one hand for process control, but also increasingly for the study of novel phenomena that play an increasingly important role, because of the progressing miniaturization, in the context of the manufacture and use of highly integrated circuits. Among these are plasmonic resonances and the scattering behavior of polaritons bound to the surface. These are a key element for high-frequency circuits on the nanometer scale.

A further method that is based on AFM—optical near field microscopy (SNOM—scanning near field optical microscopy)—utilizes light which is guided through a light-permeable opening in the measurement tip onto the surface to be studied and which is analyzed by means of an interferometer or a photo detector located a small distance behind the transparent sample. This method exclusively utilizes—due to its operating principle—light that can be guided through suitable media (for example glass fibers). Known methods of atomic force microscopy primarily include:

- the contact mode (contact mode), in which the measurement tip is in contact with the surface and is moved at a constant support force across the same.
- the contact-less mode, in which the cantilever is sent into oscillations and the amplitude and phase of these oscillations are measured and controlled so that a contactless interaction with the surface occurs. This mode provides topological information.
- the shear force mode (shear force), in which oscillations of the measurement tip are measured parallel to the surface.

The two last-mentioned AFM-methods offer the advantage that for scanning no inelastic, electronic exchange effect with the surface is necessary and therefore biological and non- or semi-conducting surfaces can also be measured. Besides that, the known methods of optical near field microscopy (SNOM-scanning near field optical microscopy) are also used for the study of biological samples. However because of the coupling of AFM principle and optical detection, they only offer limited possibilities for the chemical and electronic identification of the surface. Most often in molecular biology special marking atoms or molecules are used that feature fluorescence in an accessible wavelength range. This useable wavelength range is significantly limited, however, due to its principle of operation.

In fundamental research an optical method has been demonstrated that employs a passive, metallic structure in order to excite plasmonic resonances [Publication by J. N. Farahani, D. W. Pohl, H.-J. Eisler and B. Hecht in Physical Review Letters 95, 017402 (2005)]. In this context light is guided by means of conventional optics from the side facing away from the cantilever to the sample and analyzed. Because of its shape, the cantilever serves as a passive antenna that is tuned to the structures under study.

The focusing of synchrotron or laser radiation onto extremely small (a few nanometers diameter) controllable areas of a sample to be studied has previously not been possible because of the absence of suitable optics. Because of the extremely high intensity and parallelness such small dimensions can nonetheless be achieved by the present invention with synchrotron light.

DE 103 07 561 A1 shows a measurement arrangement for combined scanning and studying of construction components that feature micro-technical, electrical contacts that is particularly suitable for all three methods that were described above. Thereby the otherwise commonly used laser optics for the readout of the bending or the oscillation amplitude and phase can be omitted entirely. This task is taken over by a heating wire (thermal bimorph actuator) that is integrated into the cantilever along with an integrated piezo-resistive resistor network. This method and such atomic force probes (piezo-resistive cantilever) with integrated bimorph actuator and differently functionalized measurement tips are described in I. W. Rangelow: "Piezoresistive Scanning Proximity Probes for Nanoscience", Technisches Messen (Technical Measurement) 72 (2005) 2, page 103-110].

Due to their operating principles, the known AFM methods have the disadvantage of not providing chemical or electronic information about the surface. The SNOM methods are limited to the wavelength range of transmission through glass fibers and require the AFM signal for the measurement, the utilization of molecular substances can falsify the investigational result a priori. The above-mentioned method of Farahani also has the disadvantage of being dependent on semi-transparent samples. The nanoscopic antenna is passive, non-contacting and therefore not configurable. The antenna cannot adapt itself to different sample conditions.

It is therefore the purpose of the present invention to overcome these key problems of the devices and methods previously used.

SUMMARY

In accordance with one aspect of the invention, the present invention includes an atomic force microscopy (AFM) device having at least one cantilever, at least one integrated piezo-resistive sensor, at least one bi-metal actuator (a so-called bi-metal actuator), and at least one measurement tip.

The invention facilitates a combination of atomic force microscopy (AFM) of the excitation of plasmon surface polaritons (SPP) of resonant surface enhanced Raman scattering (SERS) and photoemission and -absorption (XPS-x-ray photoemission, XAS-x-ray absorption spectroscopy) by means of light, in particular synchrotron radiation. The combination of these methods is achieved through the configuration of the atomic force measurement tip and the special geometric arrangement.

By means of the device or the method according to the invention it is possible to provide complementary information and material modification opportunities. The combination of the AFM method with resonant, surface-enhanced Raman scattering (SERS) and photoemission and absorption (XPS-x-ray photoemission XAS-x-ray absorption spectroscopy) is achieved through the configuration of the measurement tip. This configuration provides an active configurability of the contacts.

The invention is based on the realization that by combining AFM with Raman and active Plasmon-resonator(s), which provide local and in situ complementary information, the prior art problems at hand can be solved. In addition, the invention offers the possibility to simultaneously utilize photoelectronic-spectroscopic methods. The geometric arrangement of the cantilever vertically to the surface to be studied, the configuration of the measurement tip by means of a hole and configurable electrodes, as well as the utilization of synchrotron radiation, which penetrates through the hole, characterize the invention.

Analytic results, which can be simultaneously obtained with the device according to the invention, can be separated through suitable evaluation. The following aspects are thereby of importance:

the AFM method works independently of the plasmon resonance and the resonant Raman scattering;

the AFM method works independently of the photoelectron spectroscopy;

Synchrotron radiation or laser light can be collimated by means of one or several holes in or next to the measurement tip to within a few nanometers.

the synchrotron radiation can, with respect to its characteristics such as intensity, wavelength, polarization (unpolarized, linear, elliptical and circular), pulsing and coherence, be tuned independently and over a wide range.

the configuration of the contacts of the measurement tip can be actively adapted to the measurement problems by adjusting the applied voltage and its frequency.

This combination furthermore permits the invention to be used to modify surfaces and areas close (several atomic layers) to the surface of the samples. In this context the modification according to the invention can be implemented using synchrotron radiation or through the mechanical influence of the measurement tip or through the exchange interaction of a plasmonic resonance between the electrodes of the tip and the sample.

By means of this combination of several measurement principles the device according to the invention permits a drastic simplification of material analysis and modification, which otherwise would require (spatially) separated methods and arrangements. Just the re-acquisition of nanoscopic structures after such a switch of methods can be in many cases impossible, for example because of contamination of the surfaces during transport, which does not occur under vacuum conditions.

Details, further embodiments and advantages of the invention can be discerned from the following description of preferred embodiments, in reference to the illustration. The drawings show:

BRIEF DESCRIPTION OF THE DRAWINGS

FIG. 2 is a perspective and lateral view of the basic construction of the device with an aperture support for coupling in of synchrotron radiation;

DETAILED DESCRIPTION

Figure 1:
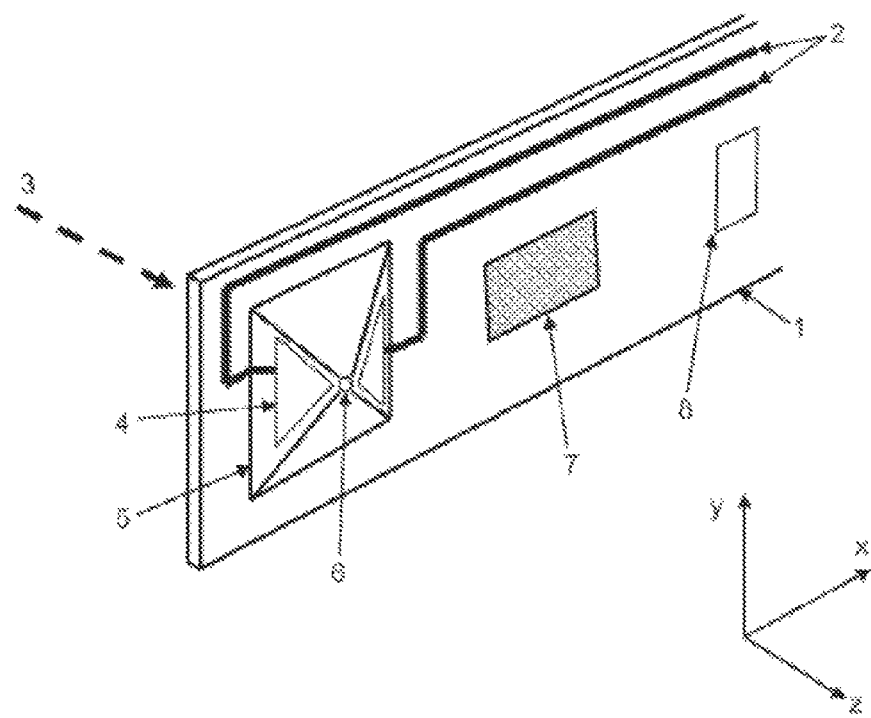
FIG. 1 is a perspective view of the basic construction of a device according to the invention with a measurement tip at a cantilever.

FIG. 1 shows the construction of the measurement tip 5 which is disposed at a cantilever 1. The measurement tip 5 features one or more holes 6 through which light 3, in particular synchrotron light or laser light, is applied to the surface of the sample to be investigated. Attached to the measurement tip 5 are at least two electrodes 4 that represent the plasmon resonator and are supplied via electrical connections 2. The hole 6 for the transmission of the light radiation 3 runs preferably centrally through the pyramid-shaped measurement tip 5 so that the light exits at the tip, between the electrodes 4. Attached to the cantilever 1 by known means are at least one integrated piezo-resistive sensor 8 and at least one integrated bimorph actuator 7.

In FIGS. 2a and 2b the basic arrangement of the device is represented which permits the coupling in of synchrotron radiation 3. The synchrotron radiation impinges laterally, horizontally onto a positionable initial aperture 9, which can be adjusted in the vertical directions (x, y) with nanometer precision on an aperture support 10.

Thereafter the radiation enters through the hole 6 in the measurement tip 5 and onto the surface of the sample. The interior side of the hole 6 can be metalized. The entire arrangement can be positioned such that the synchrotron radiation 3 impinges with a constant intensity through the hole 6 in the measurement tip 5 onto the surface of a sample 11. The sample is then moved in raster fashion in both vertical directions (x, y) on a positioning table 12. The control of this table is coupled with the control of the AFM and the described method.

Figure 3:
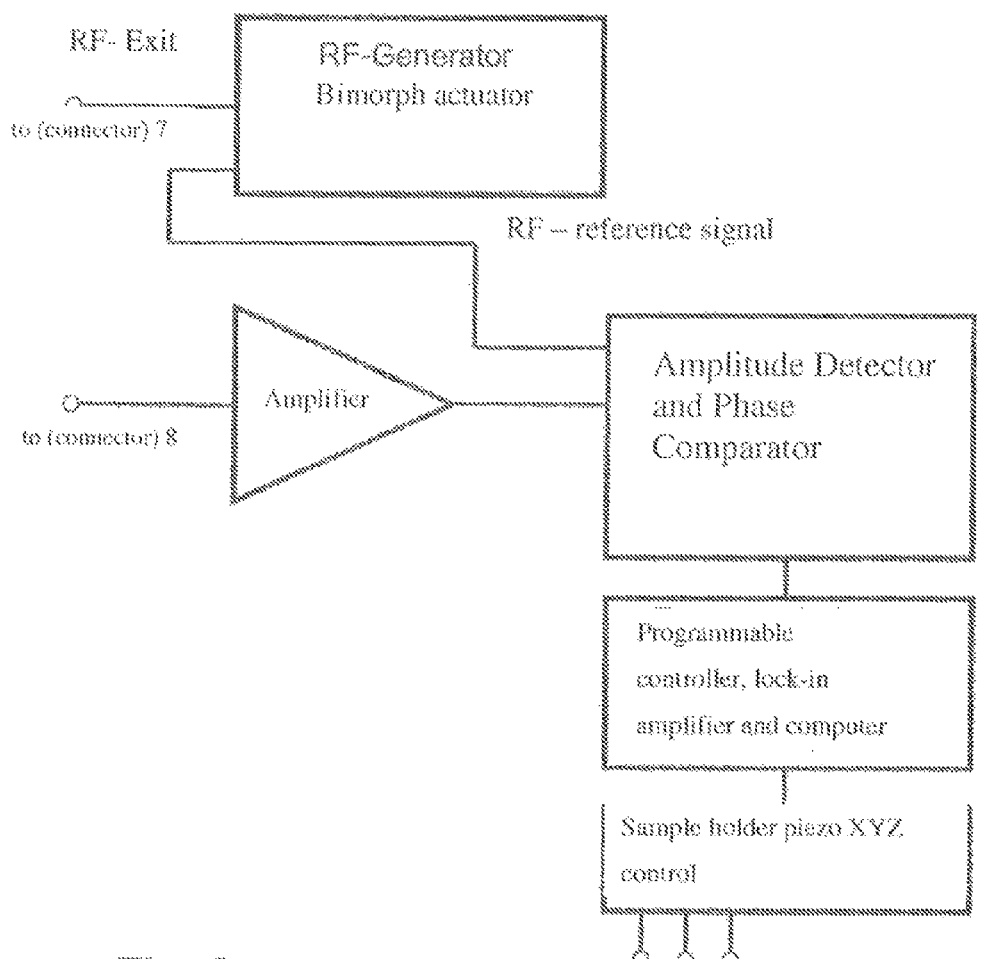
FIG. 3 is a block circuit diagram of a circuit for the control of the AFM by means of amplitude and phase detection.

In FIG. 3 a block circuit diagram of the AFM during amplitude and phase detection is represented. The detection is performed by measuring the amplitude with aid of the network of the piezo-resistors 8 that are integrated in the cantilever 1. The measurement of the phase is performed by comparing the phase of the excitation channel and that of the measurement signal of the piezo-resistors 8.

Figure 4:
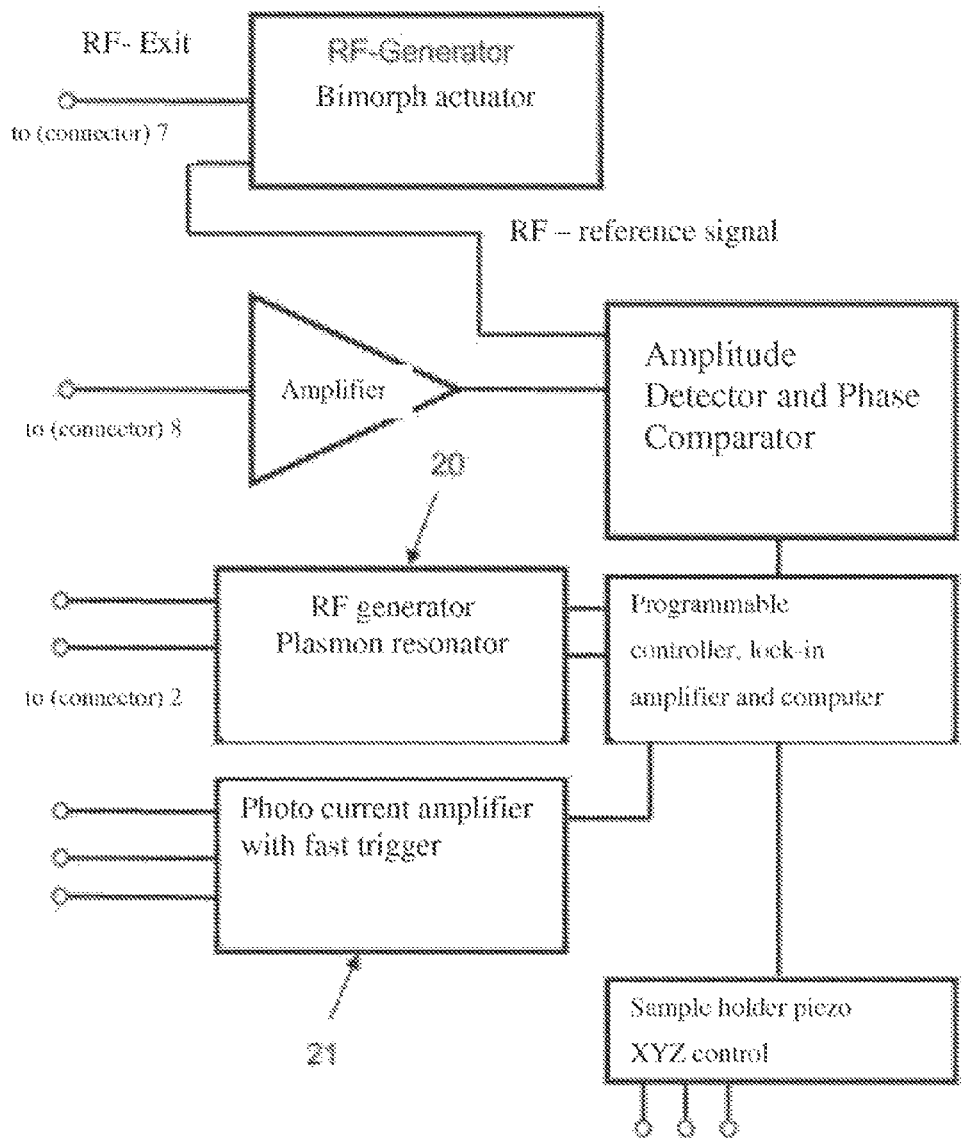
FIG. 4 is a block circuit diagram of a circuit for the control of the configurable, active plasmonic resonator on the measurement tip.

FIG. 4 shows a block circuit diagram for the control of the configurable plasmon resonator 20, which is attached to the measurement tip 1. A function generator 20 generates the resonance frequency whose amplitude and phase depends sensitively on the electronic environment of the antenna, or therefore on the sample surface 11.

The method according to the invention also permits the passive utilization of the resonator, as a receiving antenna.

Figure 5:
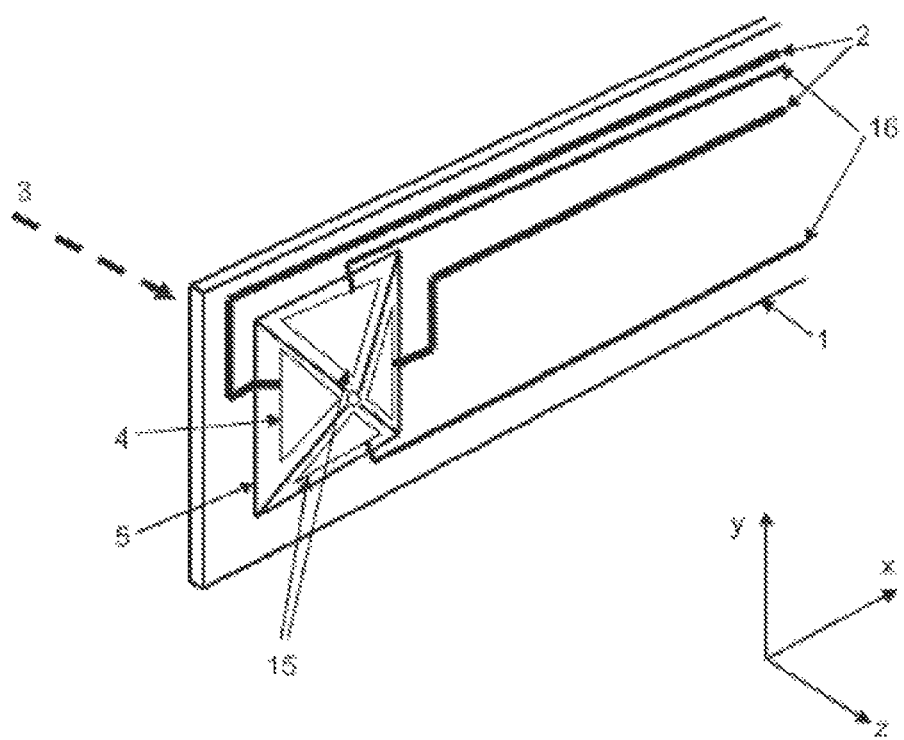
FIG. 5 is a perspective view of a modified embodiment of the measurement tip of the device.

FIG. 5 presents a modified embodiment of the measurement tip 5, which in addition to the first electrodes 4 also carries two additional electrodes 15, which are electrically connected by means of additional connections 16. The detection of photoelectrons is thereby additionally possible. One or several charge-sensitive preamplifiers 21 (FIG. 4) deliver the measurement signal. This measurement signal includes local information of the photoemission, and provides local, electronic information about the surface of the sample 11 under study.

Figure 7:
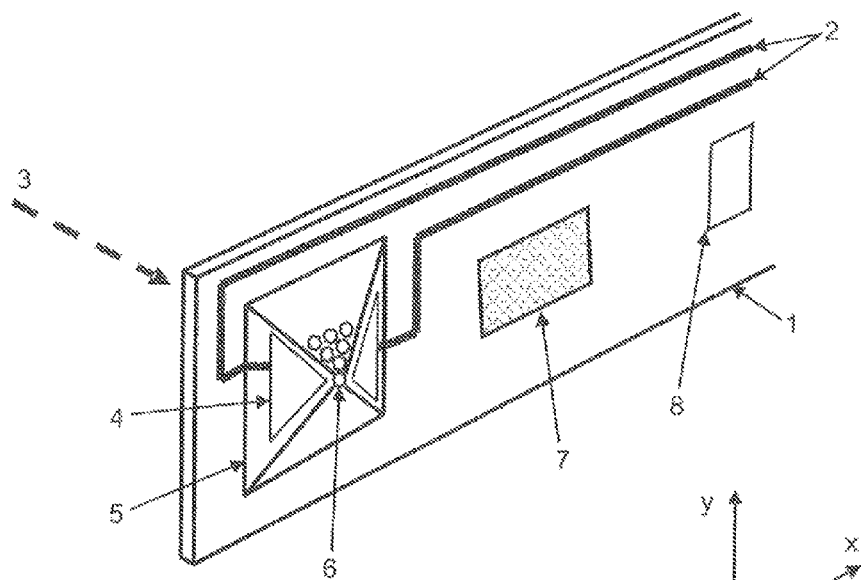
FIGS. 7 and 8 show other embodiments of the device which include multiple holes.
Figure 8:
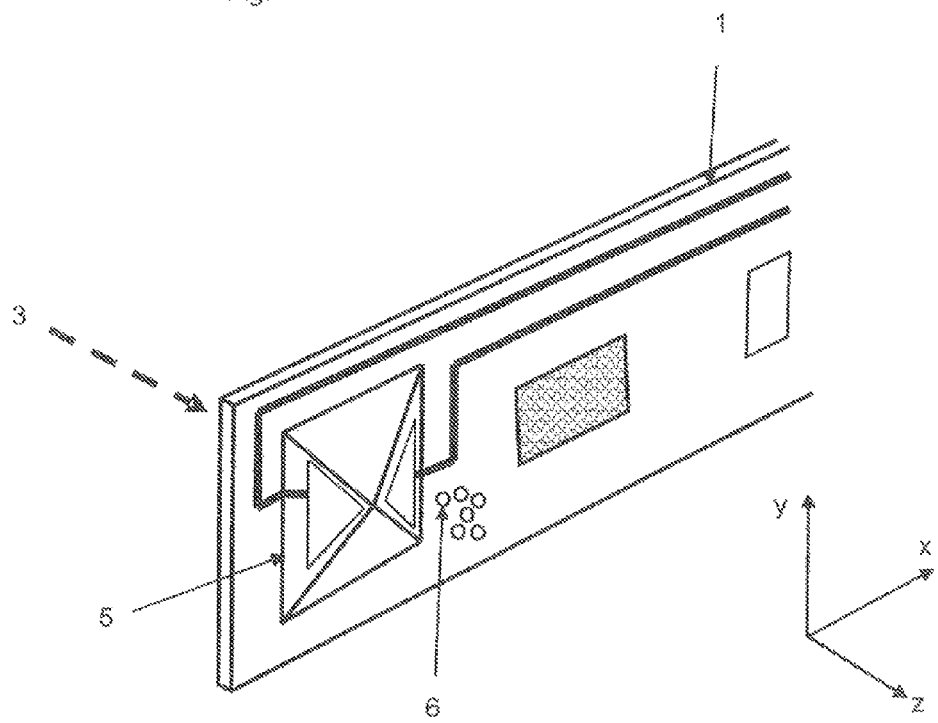

As shown in FIG. 7, a further possible embodiment consists of providing several holes 6 in a measurement tip 5 in one or several measurement tips. A spatial overlay of the synchrotron radiation behind the tip is achieved through several holes 6 in one or several cantilevers 1. FIG. 8 shows an embodiment in which multiple holes are located in the measurement tip. The principle is based on the anomalous transmission phenomenon (anomalous transmission phenomenon) that appears in the context of metalized nanoscopic holes [compare for example publication of C. Genet and W. Ebbesen in Nature, Vol 445, 4 Jan. 2007, page 39-46].

Figure 6:
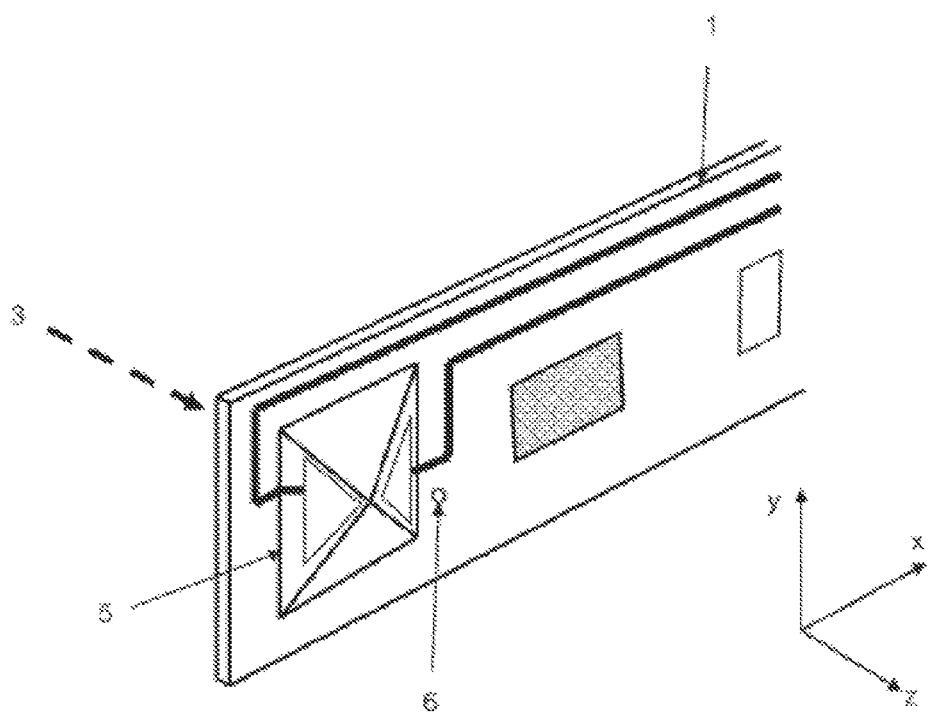
FIG. 6 is a perspective view of another modified embodiment of the device with a hole external to the measurement tip.

FIG. 6 presents a perspective view of another embodiment of the measurement tip 1. The hole 6 in this case is not positioned in but instead next to the measurement tip 5 in the cantilever 1.

The invention claimed is:

1. An atomic force microscope (AFM) device for studying and/or modifying a material surface, comprising:
    a cantilever having an integrated, piezo-resistive sensor, an integrated bimorph-actuator, and a measurement tip, said cantilever and/or the measurement tip having at least one nanoscopic hole;
    at least two metallic electrodes carried by the measurement tip to represent a Plasmon resonator; and
    at least one electrical connection for controlling said electrodes.

2. The AFM device according to claim 1, wherein the piezo-resistive sensor, the bimorph-actuator, and the electrodes are independently controllable of each other.

3. The AFM device according to claim 2, wherein the piezo-resistive sensor, the bimorph-actuator, and the electrodes are disposed on the cantilever and galvanically separated from one another.

4. The AFM device according to claim 3, wherein the at least one nanoscopic hole includes a plurality of nanoscopic holes.

5. The AFM device according to claim 4, further comprising an aperture support disposed on a side of the cantilever opposing the material surface, said aperture support having an initial aperture disposed therein through which a synchrotron radiation or a laser light is guided.

6. The AFM device according to claim 5, wherein the aperture support is movable along axes that run perpendicularly through the initial aperture in order to align the initial aperture with the hole.

7. The AFM device according to claim 4, wherein the at least two metallic electrodes includes at least four electrodes attached to the measurement tip, said four electrodes being controllable in pairs independently of each other by the electrical connections.

8. The AFM device according to claim 1, wherein the at least one nanoscopic hole includes a plurality of nanoscopic holes.

9. The AFM device according to claim 8, wherein the plurality of nanoscopic holes are formed in the cantilever.

10. The AFM device according to claim 1, further comprising an aperture support disposed on a side of the cantilever opposing the material surface, said aperture support having an initial aperture disposed therein through which a synchrotron radiation or a laser light is guided.

11. The AFM device according to claim 10, wherein the aperture support is movable along axes that run perpendicularly through the initial aperture in order to align the initial aperture with the hole.

12. The AFM device according to claim 1, wherein the at least two metallic electrodes includes at least four electrodes attached to the measurement tip, said four electrodes being controllable in pairs independently of each other by the electrical connections.

13. A method for studying and modifying material surfaces and near-surface properties, characterized using the AFM device set forth in claim 1.

14. The method of claim 13 further comprising: performing atomic force microscopy (AFM); performing resonant Raman scattering (SERS); performing photoemission spectroscopy (XPS, XAS); and performing a material modification using local illumination.

15. The method of claim 14 wherein the performing steps are executed consecutively.

16. The method of claim 14 wherein the performing steps are executed simultaneously.

17. A method for studying and modifying material surfaces and near-surface properties, characterized using the AFM device set forth in claim 1, the method further comprising: performing atomic force microscopy (AFM); performing resonant Raman scattering (SERS); performing photoemission spectroscopy (XPS, XAS); and performing a material modification using local illumination.

18. An atomic force microscope (AFM) device for studying and/or modifying a material surface, comprising:
    a cantilever having an integrated, piezo-resistive sensor, an integrated bimorph-actuator, and a measurement tip;
    at least two metallic electrodes carried by the measurement tip;
    at least one electrical connection for controlling said electrodes;
    at least one nanoscopic hole associated with the cantilever through which a synchrotron radiation or a laser light is aimed onto the material surface to be studied and/or modified; and
    an aperture support disposed on a side of the cantilever opposing the material surface, said aperture support having an initial aperture disposed therein through which the synchrotron radiation or the laser light is guided, wherein the aperture support is movable along axes that run perpendicularly through the initial aperture in order to align the initial aperture with the hole.

* * * * *